United States Patent [19]

Wieting

[11] 4,202,388
[45] May 13, 1980

[54] APPARATUS AND METHOD FOR CUTTING ACCESS OPENINGS FOR ELECTRICAL OUTLET BOXES IN WALL OR CEILING COVERING PANELS

[76] Inventor: James H. Wieting, 12914 Memorial Dr., Houston, Tex. 77079

[21] Appl. No.: 956,183

[22] Filed: Oct. 31, 1978

[51] Int. Cl.² ............................ B27C 1/00; G01B 5/14
[52] U.S. Cl. ........................ 144/323; 33/DIG. 10; 33/180 R; 144/144 R; 144/144.5 R; 409/178
[58] Field of Search ................ 33/DIG. 10, 180 R; 144/144 R, 150, 144.5, 323; 409/178, 182

[56] References Cited

U.S. PATENT DOCUMENTS

| | | | |
|---|---|---|---|
| 2,775,812 | 1/1957 | Mohr | 33/DIG. 10 |
| 2,788,151 | 4/1957 | Shore | 33/DIG. 10 |
| 3,884,280 | 5/1975 | Chailer | 144/144 R |
| 3,888,013 | 6/1975 | Benoit | 33/DIG. 10 |

Primary Examiner—Robert Louis Spruill
Assistant Examiner—W. D. Bray
Attorney, Agent, or Firm—Jennings B. Thompson; Marvin B. Eickenroht

[57] ABSTRACT

The invention disclosed includes locator pins for positioning in the cover plate mounting holes of an electrical outlet or switch box to pierce a wall or ceiling covering panel when positioned over the box. A cutter spacer is placed in a predetermined position relative to the locator pins and attached to the panel. A cutter locator ring is positioned over the cutter spacer and a cutter guide is positioned over the locator ring and attached to the panel. The cutter guide locator ring is then removed to allow a cutter to be positioned between the cutter spacer and the cutter guide to make a cut around the inside of the cutter guide. As the cut is being made, the cutter is guided by the inside surface of the cutter guide while the cutter is held by the cutter spacer to limit the depth of cut of the cutter and to prevent the cutter from moving inwardly with the panel after the access opening has been cut in the panel.

6 Claims, 5 Drawing Figures

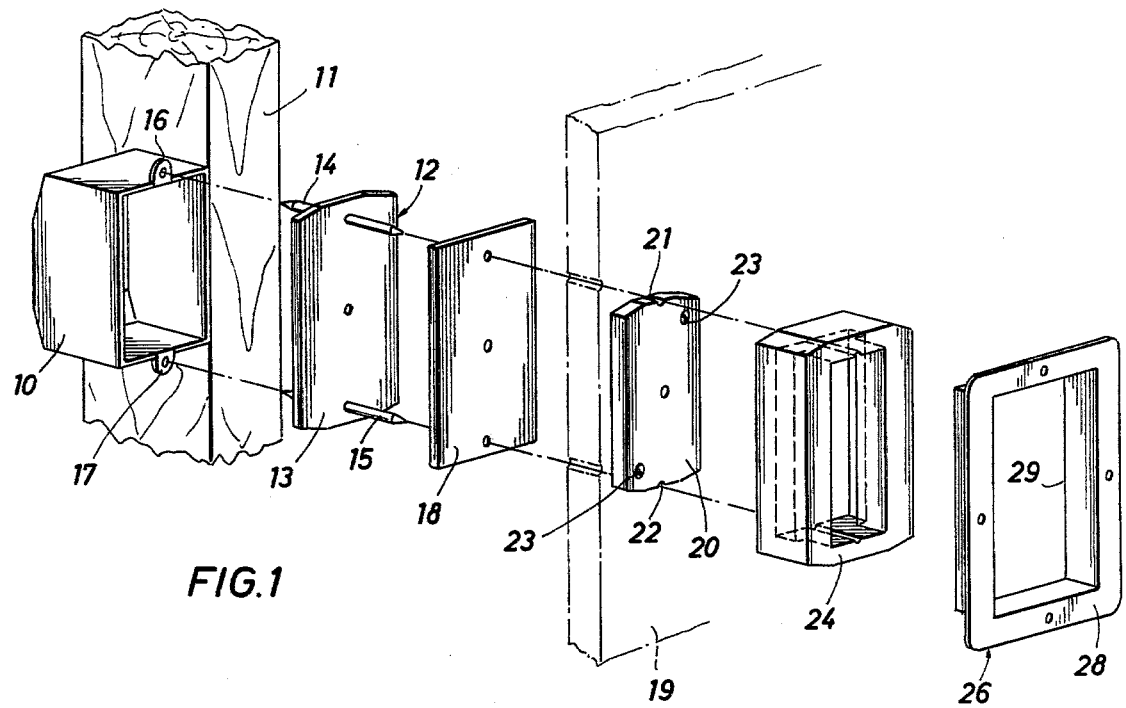
FIG. 1
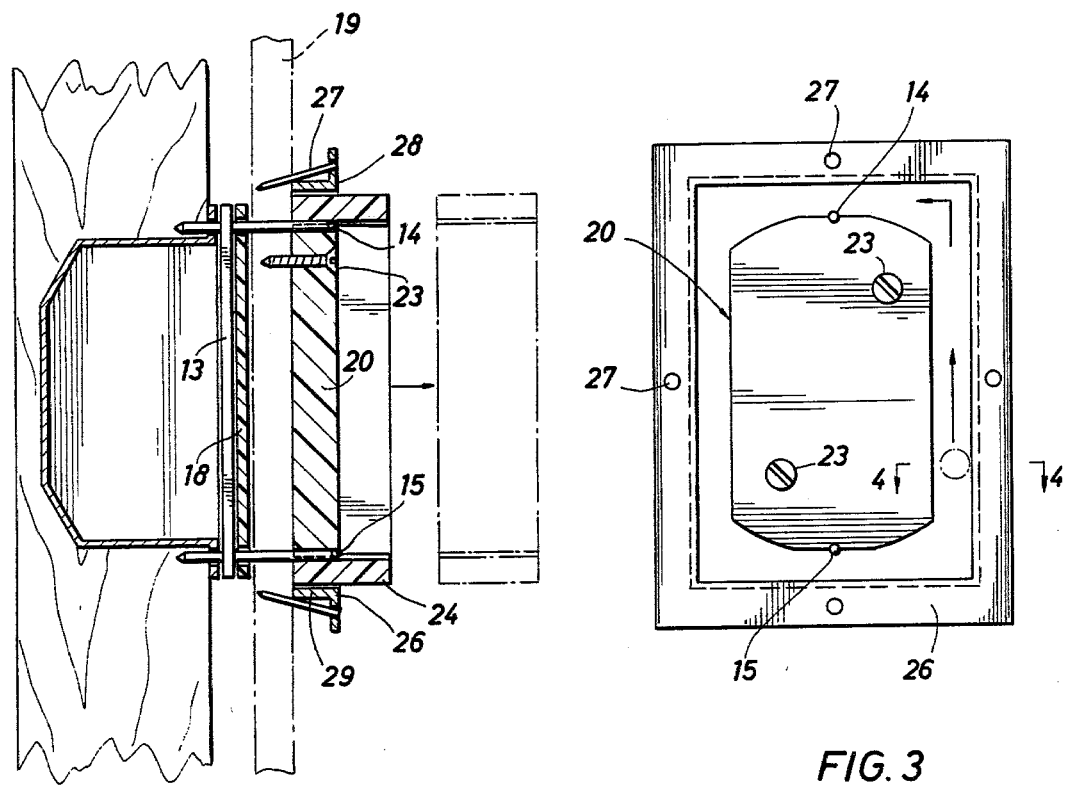
FIG. 2
FIG. 3

APPARATUS AND METHOD FOR CUTTING ACCESS OPENINGS FOR ELECTRICAL OUTLET BOXES IN WALL OR CEILING COVERING PANELS

This invention relates to building construction and is directed more particularly to apparatus for and a method of cutting access openings for electrical outlet and switch boxes in wall and ceiling covering panels, such as sheets of wallboard, wood paneling, and the like. Specifically, this invention relates to apparatus for and a method of positioning a template or cutter guide member for guiding a cutter to cut an acurately positioned opening in a wall or ceiling covering to receive and expose an electrical outlet or switch box.

Various devices have been proposed that can be mounted on outlet boxes or switch boxes to position templates to guide cutting tools for forming an access opening in a panel to receive and expose an electrical outlet or switch box. For example, see my U.S. Pat. No. 4,059,905 and also, U.S. Pat No. 3,823,754.

As shown in the above listed patents, template locating members have been provided for mounting on the outlet boxes to extend through a covering member or panel to locate a template to guide the cutting of an access opening. Some of the templates guide the cutters around their outside edges. Others guide the cutters around the inside edges of openings in the template. The most common tool used o to cut these access openings is the router. These tools are provided with template guides that include a hub to engage the guiding surface of the template and a template guide plate having a surface transverse the longitudinal axis of the cutter to engage the template and limit the depth of cut. When using these prior templates with a router, router guide plate is supported only on one side, which means the operator must exercise care to maintain the cutter in a perpendicular position relative to the plane of the wall covering member. In addition, when using the inside surface of a template to guide the cutter, as cutting of the the access opening is completed, the wall panel will move inwardly over the outlet box which can cause the cutter to move into and damage the outlet box or the stud upon which it is mounted before the operator can stop the cutting operation.

Therefore, it is an object of this invention to provide a cutter guide or template having an opening to guide a cutter around the inside surface of the template to cut the desired access opening in a wall or ceiling panel and to also provide means for engaging the router template guide plate on the opposite side from the template to provide support on both sides of the cutter to maintain the cutter in a perpendicular position relative to the wall member as the cutter cuts the access opening and further to hold the cutter from moving inwardly as the opening is completed and the panel moves forwardly into position over the box.

Other objects, advantages, and features of the invention will be apparent to those skilled in the art from a consideration of this specification, including the attached drawings and appended claims.

In the drawings:

FIG. 1 is an exploded isometric view of the apparatus of this invention showing the sequence of use;

FIG. 2 is a sectional view of the apparatus assembled in position on both sides of a panel;

FIG. 3 is a plan view of the apparatus of FIG. 2, with the cutter guide locator ring removed and with the cutter in position moving around the inside surface of the cutter guide as it cuts the access opening;

Figure 4:
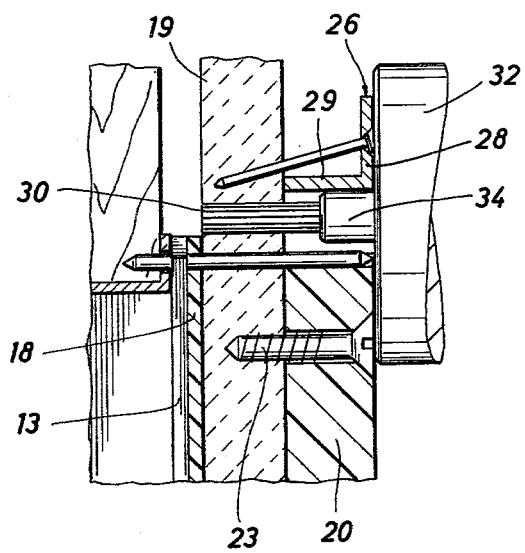
FIG. 4 is a sectional view taken along line 4—4 of FIG. 3.

For simplication of the description, the term "outlet box" will be used throughout with the understanding that this has reference to an electrical outlet box, a switch box, a light fixture, or the like.

In FIG. 1, for example, outlet box 10 of conventional design is mounted on the side of stud 11.

Locator means are provided for mounting on the box for extending through the portion of the panel to be cut away in a pre-determined position relative to the box. As shown in FIG. 1, locator pin assembly 12 comprising plate 13 and locator pins 14 and 15 are arranged for the portion of the pins on one side of the plate to extend into the cover plate mounting holes provided by tabs 16 and 17 on the outlet box. For reasons to be described below, spacer plate 18 is next positioned over pins 14 and 15 through holes provided therefore in the spacer plate. Wall or ceiling covering member or panel 19 shown in phantom lines in FIGS. 1 and 2, is cut to the desired length and placed in position over the outlet box and pushed toward the outlet box, forcing pins 14 and 15 through the panel as shown in FIG. 2. The panel is then tacked at the top and bottom.

Cutter spacer means are provided for attaching to the panel in a predetermined position relative to the locator means. In the embodiment shown, cutter spacer 20 has grooves 21 and 22 on opposite ends to receive locator pins 14 and 15 to properly position the cutter spacer relative to the opening to be cut in the panel. When positioned on the outside of the panel by the pins, the cutter spacer is securely attached to the panel by screws 23. Cutter guide locator means comprising in the embodiment shown, cutter guide locator ring 24 is positioned over cutter spacer 20 as shown in FIG. 2. The cutter guide locator ring is not attached to the panel but is held in position while cutter guide 26 is positioned over the cutter guide locator ring, as shown in FIG. 2. While so positioned over the locator ring, the cutter guide is attached to the panel by nails 27. Preferably, the nails are inclined toward the box so that they penetrate the portion of the panel that will be covered by the cover plate of the box.

The cutter guide in the embodiment shown is L-shaped in cross section. It includes flange portion 28 having a surface generally parellel to the panel and annular portion 29 that is perpendicular to the surface of the panel. Annular portion 29 provides a guide for the cutter and also spaces flanged portion 28 from the panel substantially the same distance as the outer surface of spacer 20.

After cutter guide 26 is attached to the panel, cutter guide locator ring 24 is removed. This provides a path for cutter 30, shown in dotted lines in FIG. 3, to travel between cutter spacer 20 and cutter guide 26 to cut an access opening in the panel.

As explained above, routers are commonly used to cut these access openings. Routers are provided with template guides, as shown in FIG. 4, comprising circular plate 32 and central hub 34 within which cutter 30 is mounted. Circular plate 32 serves to engage the work surface and limit the depth of cut of the cutter. This distance is adjustable on all routers and before cutting the access opening, the cutter should be adjusted to cut just deep enough to penetrate the panel. Hub 34 engages the inside surface of guide 26 to guide the cutter as it cuts the access opening. As shown in FIG. 4, both flange 28 on the cutter guide and the cutter spacer support the router template guide plate 32 on opposite sides of the longitudinal axis of the cutter. This eliminates any tipping of the cutter blade from a position perpendicular to the panel, a problem described above. Also, when the access opening is completed with the panel 19 tacked in place at the top and bottom, the panel will have sufficient resiliency to immediately move inwardly against stud 11. As this happens, however, cutter spacer 20 being mounted on the box will hold the router from movement with the panel. This prevents damage from occurring to the stud or to the outlet box due to a sudden forward movement of the cutter with the panel.

The scrap from the access hole along with locator pin assembly 13, spacer 18, and cutter spacer 20 can now be removed through the opening in cutter guide 26. The cutter guide then is removed from the panel by pulling nails 27 and the job is completed.

Spacer 18 between the locator pin assembly and the panel is used to space the panel further away from the outlet box to provide more clearance between the cutter and the outlet box should something slip. The use of this spacer is optional.

Figure 5:
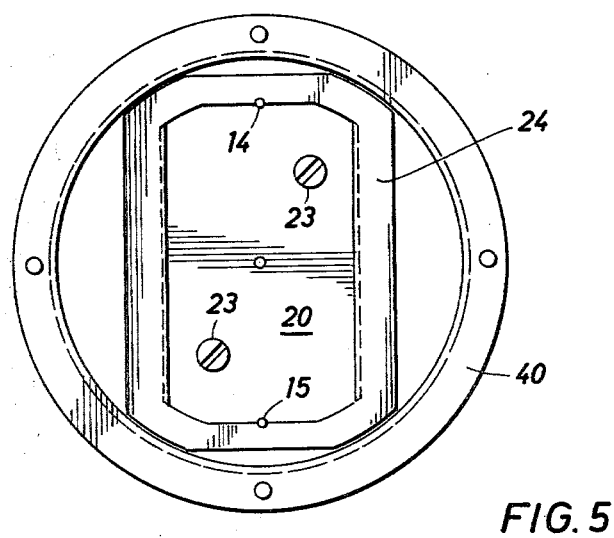
FIG. 5 is a plan view similar to FIG. 3 showing the use of a cutter guide for circular outlet boxes and switch boxes.

It is one of the features of this invention to provide cutter guide locator means for use with both circular cutter guides and rectangular cutter guides. As shown in FIGS. 1 and 5, cutter guide locator ring 24 is generally rectangular, having an opening designed to fit the outside surface of cutter spacer 20. When positioned over the cutter spacer, rectangular cutter guide 26 can be positioned by the cutter guide locator ring or alternatively, as shown in FIG. 5, circular cutter guide 40 for use with circular access openings can likewise be positioned. To accomplish this, the cutter guide locator ring is generally rectangular, however, the corners of the locator ring are arcuate, having a curvature such that they match the curvature of the inside circular surface of locator ring 40 to allow the ring to be positioned on these surfaces before being attached to the panel. When cutting a circular opening, again both the cutter guide and the cutter spacer serve to support the template guide on the router on opposite sides of the cutter and to prevent the router from moving forwardly with the panel after the access opening has been completed.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and sub-combinations. This is contemplated by and is within the scope of the claims.

As many possible embodiments may be made of this invention without departing from the scope thereof, it is to be understood that all matter herein set forth or shown in the accompanying drawings is to be interpreted as illustrative and not in a limiting sense.

I claim:

1. Apparatus for guiding a cutter as it cuts an opening in a wall or ceiling covering panel to receive an electrical outlet or switch box comprising locator means for mounting on the box for extending through the portion of the panel to be cut away in a pre-determined position relative to the box, cutter spacer means for attaching to the panel in a pre-determined position relative to the locator means, cutter guide locator means for positioning on the cutter spacer means, cutter guide means for positioning on the cutter guide locator means, means for attaching the cutter guide means to the panel when positioned on the cutter guide locator means to allow the cutter guide locator means to be removed from its position on the cutter spacer means to provide space between the cutter spacer means and the cutter guide means for a cutter as it cuts an opening in the panel to receive the box while being guided by the cutter guide means and held by the cutter spacer means to a pre-determined depth of cut.

2. The apparatus of claim 1 in which the cutter guide locator means is generally rectangular for positioning guide means for guiding a cutter along a rectangular path and has arcuate corners for positioning guide means for guiding a cutter along a circular path.

3. apparatus for cutting an opening in a wall or ceiling covering panel to receive an electrical outlet box or switch box having mounting holes for the box cover plate, comprising a locator pin for positioning in the mounting hole for the box cover plate to pierce the panel when the panel is installed, a cutter spacer for attaching to the panel in a position determined by the locator pin, a cutter guide locator ring for mounting on the cutter spacer for positioning a cutter guide in the desired position relative to the cutter support, a cutter guide for positioning on the locator ring, means for attaching the cutter guide to the panel when properly positioned on the locator ring to allow removal of the locator ring whereby the cutter guide can guide a cutter as it cuts an opening in the panel while the cutter support member holds the cutter in position for the desired depth of cut and prevents the cutter from moving toward the box with the panel during and after the cut is completed.

4. The apparatus of claim 3 further provided with a spacer located between the box and the panel to provide clearance between the cutter and the box.

5. A method of cutting an opening in a wall or ceiling covering panel to receive an electrical outlet or switch box or the like comprising placing a locator pin in the cover plate mounting hole of the box, moving the covering panel into the desired position with the locator pin extending through the panel, positioning a cutter spacer on the locator pin, attaching the cutter spacer to the panel, positioning a cutter guide locator ring on the cutter spacer, positioning a cutter guide over the cutter guide locator, attaching the cutter guide to the wall covering, removing the cutter guide locator ring to provide a space between the cutter spacer and cutter guide for the cutting tool, and cutting out an opening for the box, using the inside surface of the cutter guide to guide the cutter and the outer surface of the cutter spacer to limit the depth of cut and to hold the cutter from longitudinal movement during and after the cut has been made.

6. The method of claim 5 with the additional step of spacing the panel from the box to provide clearance between the box and the cutter.

* * * * *